United States Patent [19]

McNamara et al.

[11] Patent Number: 5,817,594
[45] Date of Patent: Oct. 6, 1998

[54] CATALYST AND HYDROTREATING PROCESS

[75] Inventors: David John McNamara; Willem Hartmann Jurriaan Stork, both of Amsterdam, Netherlands

[73] Assignee: Shell Oil Company, Houston, Tex.

[21] Appl. No.: 556,888

[22] Filed: Nov. 2, 1995

[30] Foreign Application Priority Data

Nov. 3, 1994 [EP] European Pat. Off. .............. 94203209

[51] Int. Cl.$^6$ ...................................... B01J 23/00
[52] U.S. Cl. ................... 502/313; 502/314; 502/325; 502/327; 502/332; 502/311; 502/355; 502/527; 208/216 PP
[58] Field of Search ............... 208/216 PP; 502/313, 502/314, 325, 327, 332, 311, 355, 527

[56] References Cited

U.S. PATENT DOCUMENTS

| | | | |
|---|---|---|---|
| 3,947,347 | 3/1976 | Mitchell | 208/251 |
| 4,455,390 | 6/1984 | Ting et al. . | |
| 4,572,778 | 2/1986 | Wart . | |
| 4,941,964 | 7/1990 | Dai et al. | 208/216 PP |
| 5,246,569 | 9/1993 | Heinerman et al. | 208/216 PP |
| 5,300,214 | 4/1994 | Creighton et al. | 208/216 PP |
| 5,397,456 | 3/1995 | Dai et al. | 208/216 PP |
| 5,399,259 | 3/1995 | Dai et al. | 208/216 PP |
| 5,435,908 | 7/1995 | Nelson et al. | 208/216 PP |
| 5,468,371 | 11/1995 | Nelson | 208/216 PP |
| 5,514,274 | 5/1996 | Simpson | 208/216 PP |

FOREIGN PATENT DOCUMENTS

| | | | |
|---|---|---|---|
| 339592 | 11/1990 | European Pat. Off. . | |
| 567272 | 10/1993 | European Pat. Off. | 208/216 PP |
| 05184941 | 7/1993 | Japan . | |
| 8403107 | 2/1986 | Netherlands . | |

*Primary Examiner*—Helane Myers

[57] ABSTRACT

Catalyst comprising a porous inorganic refractory oxide wherein the catalyst has:

(a) a total pore volume in the range of from 0.2 to 0.5 ml/g, (b) a macroporosity of at least 0.1 ml/g, (c) a microporosity of at least 0.05 ml/g, and (d) a surface area of at least 5 m$^2$/g.

Process for reducing the amount of solid contaminants and the amount or dissolved metallic contaminants, wherein a hydrocarbon oil containing such contaminants is contacted with hydrogen under hydrotreating conditions in the presence of the above catalyst.

13 Claims, No Drawings

CATALYST AND HYDROTREATING PROCESS

FIELD OF THE INVENTION

The present invention relates to a catalyst and to a hydrotreating process for removing both solid contaminants and dissolved metallic contaminants from a hydrocarbon oil, wherein this catalyst is used.

BACKGROUND OF THE INVENTION

Hydrotreating processes for removing solid as well as dissolved metallic contaminants are known in the art. For instance, in European Pat. No. 399,592 a hydrotreating process is disclosed for the removal of solid and dissolved contaminants using as the catalyst porous inorganic oxide particles having a surface area of at most 1 $m^2/g$ and a pore volume of at least 0.1 ml/g in pores having a diameter of at least 10 microns. The inorganic oxide may additionally contain oxides or sulfides of metals of Group VA, VIA and/or VIII. From Japanese Pat. No. 05/184941 a hydrotreating process for removing solids and dissolved contaminants is known, wherein a catalyst is used having a surface area above 5 $m^2/g$, a pore volume of 0.1 ml/g in micropores having a diameter of at least 0.004 micron (40 Å) and a void ratio of 30 to 70%. The catalyst may also additionally contain oxides or sulfides of metals of Group V, VI and/or VIII. In U.S. Pat. No. 3,947,347 a hydrotreating process for removing metallic contaminants from a hydrocarbon feedstock is disclosed, in which process a catalyst is used which is free of any hydrogenating component and which has a surface area of from 1 to 20 $m^2/g$ and pores having an average diameter of from 0.1 to 1 micron (1,000 to 10,000 Å).

The present invention aims to provide a hydrotreating process for the simultaneous removal of solid contaminants and dissolved metallic contaminants wherein this catalyst can suitably be used. In this hydrotreatment process solid, as well as, dissolved metallic contaminants should be adequately removed from any hydrocarbon oil fraction ranging from naphtha to residual oils, whereby long operation times with a minimized pressure drop across the catalyst bed are attained. The present invention, accordingly, aims to provide a catalyst having an increased uptake capacity for metallic contaminants, in particular an increased solids uptake capacity, thus allowing longer operation times and lower pressure drop when used in a process for hydrotreating hydrocarbon oils containing such contaminants.

It has been found that a catalyst comprising a porous inorganic refractory oxide and meeting specific requirements as regards its pore volume, microporosity, macroporosity and surface area can achieve these aims.

SUMMARY OF THE INVENTION

Accordingly, the present invention relates to a catalyst comprising a porous inorganic refractory oxide wherein the catalyst has:
(a) a total pore volume in the range of from 0.2 to 0.5 ml/g,
(b) a macroporosity of at least 0.1 ml/g,
(c) a microporosity of at least 0.05 ml/g and preferably from 0.05 to 0.15 ml/g, and
(d) a surface area of at least 5 $m^2/g$, preferably 5 to 20 $m^2/g$.

DESCRIPTION OF THE PREFERRED EMBODIMENT

The inorganic refractory oxide used can be any such oxide known in the art to be suitably applied in hydrotreating catalysts. Suitable oxides, then, include alumina, silica, alumina-boria, titania, silica-alumina, magnesia, silica-magnesia and mixtures of one or more of these refractory oxides. For the purpose of the present invention it is, however, preferred that the porous refractory oxide comprises at least 80% by weight of alumina, suitably alpha-alumina, based on total weight of catalyst. In an even more preferred embodiment of the present invention the refractory oxide comprises at least 80% by weight of alpha-alumina with the remainder up to 100% by weight being silica.

The catalyst according to the present invention should have both macroporosity and microporosity. With the term "macroporosity" as used through this specification is meant the pore volume in pores having a diameter of at least 0.1 micrometer (micron). With the term "microporosity" as used throughout this specification is meant the pore volume in pores having a diameter of 0.02 micron or less. Without wishing to be bound by any particular theory, it is believed that removal of dissolved metallic contaminants present in a hydrocarbon oil feed is initiated in the micropores where hydrogenation of the dissolved species is assumed to take place. The small metallic particles formed as a result of this hydrogenation are subsequently trapped in the macropores. The solid contaminants, on the other hand, are directly trapped in the macropores. By choosing the right balance between microporosity and macroporosity, optimum removal of both solid and dissolved metallic contaminants can be achieved. As has already been described above, the catalyst according to the present invention has a macroporosity of at least 0.1 ml/g combined with a microporosity of at least 0.05 ml/g, preferably from 0.05 to 0.15 ml/g, whereby the total pore volume is within the range of from 0.2 to 0.5 ml/g. Beside these conditions with respect to the porosity, the surface area of the catalyst is also an important factor. For the purpose of the present invention it has been found essential that the catalyst has a surface area of at least 5 $m^2/g$. In a preferred embodiment of the present invention the catalysts have a surface area in the range of from 5 to 20 $m^2/g$. In case the catalyst further comprises one or more catalytically active metals as a hydrogenation component, a surface area of at least 5 $m^2/g$ is necessary to ensure a good dispersion of the hydrogenation component.

When used in a hydrotreating process, the catalyst according to the present invention is suitably used in the form of a fixed bed of catalyst particles over which the oil feed is passed. A generally recognized problem in these kind of fixed bed hydrotreating operations is the pressure drop occurring after a certain time of operation. Such pressure drop is an indication of the fact that the catalyst bed, i.e. both the pores of the catalyst particles and the interstitial space between the different catalyst particles, becomes more and more plugged with contaminants. The porosity of the catalyst particles, accordingly, is a very important parameter in connection with pressure drop. By applying a catalyst having a porosity as described above, pressure drop across the catalyst bed can be reduced significantly.

Furthermore, the shape of the catalyst particles will also have some bearing on the pressure drop. This shape, namely, greatly influences the packing of the catalyst in the bed and hence the volume of the interstitial space of the catalyst bed. In principle, the catalyst particles may have any shape, known to be suitable in fixed bed hydrotreating operations. Examples of suitable catalyst particle shapes, then, include spheres, wheels, quadrulobes and trilobes. Suitable catalyst particle sizes are those normally used, i.e. diameters of 20 mm or less, suitably 2 to 15 mm and even more suitably 3 to 10 mm. For the purpose of the present invention the catalyst particles preferably are in the shape of a hollow cylinder. This shape, namely, allows the solid contaminants to be trapped in the inner space of the cylinder as well. Solid contaminants can, accordingly, be trapped in the macropores as well as in the inner space of the hollow cylinder. This enables a higher amounts of solids to be trapped, which in return allows longer operation times without any pressure drop occurring. Preferably, the catalyst particles in the shape of a hollow cylinder have an external diameter in the range from 3 to 20 mm, preferably 4 to 12 mm, more preferably 5 to 10 mm, an internal diameter of from 1.5 to 10 mm, whereby the ratio external diameter to internal diameter has a value in the range from 2 to 14, and a length of from 0 to 25 mm, preferably 4 to 20 mm, more preferably 4 to 10 mm, in order to have an optimum solids uptake capacity.

The removal of dissolved metallic contaminants can be further improved by supporting one or more catalytically active metals as hydrogenation component onto the porous refractory oxide. It is therefore, preferred that the catalyst according to the present invention in addition to the porous inorganic refractory oxide, further comprises at least one metal selected from the group consisting of Group VA metals, Group VIB metals and Group VIII metals (as defined in the Chemical Abstracts Service), as the hydrogenation component. The catalytically active metals may be present as oxide and/or as sulfide. Preferably, the catalyst comprises a combination of catalytically active metals. Preferred combinations to that end are nickel plus molybdenum and cobalt plus molybdenum as the catalytically active metals. Phosphorous may be present too as a promoter. Nickel or cobalt is suitably present in an amount of from 0.1 to 5.0% by weight, preferably from 0.5 to 2.0% by weight, molybdenum is suitably present in an amount of 0.5 to 10% by weight, preferably from 1.5 to 5.0% by weight, and, if present at all, phosphorus is suitably present in an amount of 0.5 to 1.5% by weight, preferably from 0.1 to 0.5% by weight, said weight percentages indicating the amount of metal based on total weight of catalyst.

Supporting of catalytically active metals onto the porous inorganic refractory oxide can be achieved by processes known in the art, for instance by impregnation techniques, whereby the refractory oxide particles are impregnated with one or more solutions of compounds of the catalytically active metals. The impregnated oxide particles are then dried and calcined to convert the metals into their oxidic form. If desired, the oxides can be converted into sulfides by pre-sulfiding treatments known in the art. Other suitable methods for supporting the catalytically active metals onto the porous refractory oxide are based on ion exchange techniques.

The present invention also relates to a process for reducing the amount of solid contaminants and the amount of dissolved metallic contaminants present in a hydrocarbon oil containing such contaminants, wherein the hydrocarbon oil is contacted with hydrogen under hydrotreating conditions in the presence of the catalyst described above.

The hydrocarbon oil treated in accordance with the process of the present invention in principle can be any oil ranging from naphtha to residual oils, which contains dissolved metallic contaminants and/or solid metallic contaminants. Accordingly, the process of the present invention can be used to treat naphtha, kerosine, gasoil, and residual oil. Particularly residual oils, including both atmospheric and vacuum residual oils, have been found to be advantageously treated by the process according to the present invention.

The process of the present invention is carried out under conventional hydrotreating conditions, for instance a total pressure of 1 to 300 bar, a hydrogen partial pressure of 1 to 250 bar, a temperature of 200° to 500° C. and a hydrogen to hydrocarbon oil ratio of 1 to 1800 nl/l.

Contaminants which can be suitably removed by the process of the present invention include inter alia scales, solid and dissolved iron species, sodium species, calcium species, molybdenum species, nickel species and vanadium species. The process of the present invention is, however, very advantageously used for reducing the content of iron contaminants in a hydrocarbon oil and therefore may be conveniently applied in an iron-guard bed reactor.

What is claimed is:

1. A catalyst comprising a porous inorganic refractory oxide, wherein the catalyst has:
   (a) a total pore volume in the range of from about 0.2 to about 0.5 ml/g,
   (b) a macroporosity of at least about 0.1 ml/g,
   (c) a microporosity of about 0.5 ml/g to about 0.15 ml/g, and
   (d) a surface area of about 5 $m^2/g$ to about 20 $m^2/g$.

2. The catalyst according to claim 1, wherein the porous inorganic refractory oxide comprises at least about 90% by weight of alumina.

3. The catalyst according to claim 1, wherein the catalyst particles are in the shape of hollow cylinders.

4. The catalyst according to claim 3, wherein the hollow cylinders have an external diameter in the range from about 3 to 20 mm, an internal diameter of from about 1.5 mm to 10 mm, whereby the ratio external diameter to internal diameter has a value in the range from about 2 to 14, and a length of from about 3 to about 25 mm.

5. The catalyst according to claim 1, wherein the catalyst further comprises at least one metal selected from the group consisting of Group VA metals, Group VIB metals, Group VIII metals and mixtures thereof.

6. The catalyst according to claim 5, wherein the catalyst comprises nickel and molybdenum.

7. The catalyst according to claim 6, wherein the catalyst additionally contains phosphorus.

8. The catalyst of claim 7, wherein the phosphorus is present in an amount in the range of from about 0.1% by weight to about 5% by weight, said weight percentage being based on the total weight of catalyst.

9. The catalyst according to claim 6, wherein nickel is present in an amount of from about 0.5 to about 2.0% by weight and molybdenum is present in an amount of from about 1.5 to about 5.0% by weight, said weight percentages being based on the total weight of catalyst.

10. The catalyst of claim 5, wherein the catalyst comprises cobalt and molybdenum.

11. The catalyst of claim 10, wherein said catalyst additionally comprises phosphorus.

12. The catalyst according to claim 10, wherein cobalt is present in an amount of from about 0.5 to about 2.0% by weight and molybdenum is present in an amount of from about 1.5 to about 5.0% by weight, said weight percentages being based on the total weight of catalyst.

13. The catalyst according to claim 11, wherein the phosphorus is present in an amount in the range of from about 0.1% by weight to about 5% by weight, said weight percentage being based on the total weight of catalyst.

* * * * *